Patented Sept. 15, 1936

2,054,334

UNITED STATES PATENT OFFICE 2,054,334

VAT DYESTUFFS OF THE PERYLENE SERIES

Paul Nawiasky and Erich Berthold, Ludwigshafen-on-the-Rhine, Germany, assignors to General Aniline Works, Inc., New York, N. Y., a corporation of Delaware No Drawing. Application August 28, 1934, Serial No. 741,875. In Germany September 8, 1933

1 Claim. (Cl. 260—124)

The present invention relates to vat dyestuffs of the perylene series and a process of producing same.

We have found that valuable vat dyestuffs are obtained by treating perylenetetracarboxylic acid diphenyldi-imide having the formula:—

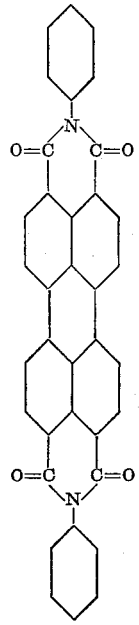

or its substitution products for example those substituted by halogen, hydroxy or alkyl groups, with chlorine or chlorinating agents, as for example sulfuryl chloride in the presence of organic liquid diluents. Suitable diluents which, of course, must not be attacked by chlorine under the reaction conditions are for example nitrobenzene, dichlorbenzene, trichlorbenzene and the chloronaphthalenes. Chlorine transferrers, such as iodine or sulfur, or agents combining with acids, such as sodium acetate, potassium acetate or pyridine, may be present during the chlorination. The reaction may be carried out at ordinary or at elevated temperatures. It is advantageous to use pure initial materials. The content of chlorine in the final products varies according to the reaction conditions, for example according to the amounts of chlorine or chlorinating agents used, the temperatures and the catalysts. For instance products containing from 2 to 4 molecular proportions of chlorine, especially those containing about 3 molecular proportions per molecule, are very valuable.

The vat dyestuffs obtainable according to the present invention dye vegetable fibres extremely clear shades of excellent fastness properties, the colour being scarlet-red. They are more readily vattable than the initial materials.

The following examples will further illustrate how the said invention may be carried out in practice but the invention is not restricted to these examples. The parts are by weight.

Example 1

21.6 parts of perylenetetracarboxylic acid diphenyldi-imide (obtainable for example by heating pure perylenetetracarboxylic acid anhydride with aniline) are heated at from 60° to 65° C. for 4 hours, while stirring, in 500 parts of nitrobenzene with 2 parts of iodine and 28 parts of sulfuryl chloride. The temperature is then raised to from 80° to 85° C., kept constant for about an hour, the whole being allowed to cool, filtered by suction and worked up in the usual manner. According to analysis the product thus obtained in a pure state and in good yields is a trichloroperylenetetracarboxylic acid diphenyldi-imide. It is an orange-red crystal powder which dissolves in concentrated sulfuric acid giving a red coloration and a yellow-red fluorescence and which dyes vegetable fibres from a deep violet vat extremely clear scarlet-red shades of excellent fastness properties, especially of good fastness to light.

Example 2

10.8 parts of perylenetetracarboxylic acid diphenyldi-imide are suspended in 100 parts of trichlorbenzene; after adding 1 part of iodine, chlorine is led in at from 160° to 170° C. until a sample withdrawn no longer yields the blue-red vat of the initial material but vats a pure violet-blue shade. The whole is worked up as described in Example 1. The dyestuff obtained dissolves in concentrated sulfuric acid giving a red coloration and a red fluorescence and dyes cotton brilliant scarlet-red shades from a violet-blue vat.

Example 3

30 parts of perylenetetracarboxylic acid-para, para'-dichlordiphenyldi-imide (obtainable for example by condensing perylenetetracarboxylic acid with para-chloraniline) are heated in 1000 parts of nitrobenzene at from 60° to 65° C. for 4 hours after the addition of 3 parts of iodine and 50 parts of sulfuryl chloride, and then at from 80° to 85° C. until a sample withdrawn no longer yields the blue-red vat of the initial material but a pure blue vat. After cooling, the whole is worked up in the usual manner. The dyestuff obtained, which according to analysis contains between four and five chlorine atoms per molecule, dissolves in concentrated sulfuric acid giving a red coloration and a red fluorescence and dyes cotton pure scarlet-red shades from a blue vat.

The chlorination may also be carried out in trichlorbenzene in the presence of iodine, iron chloride or other usual chlorine transferrers.

*Example 4*

57 parts of perylenetetracarboxylic acid-para, para'-dimethyldiphenyldi-imide are suspended in 800 parts of nitrobenzene. After the addition of 6 parts of iodine and about 90 parts of sulfuryl chloride the mixture is heated for 2 hours at 60° to 65° C. and then to 85° to 90° C. until initial material can no longer be detached. After cooling, the dyestuff is filtered off by suction. According to analysis it is a derivative of the initial substance, containing 4 to 5 chlorine atoms in its molecule. It dissolves in concentrated sulfuric acid giving a red coloration and a red fluorescence. It dyes cotton clear scarlet-red shades of excellent fastness from a blue vat.

Dyestuffs of similar properties are obtained by treating perylenetetracarboxylic acid - ortho, ortho'- or -meta, meta'-dimethyldiphenyldiimide.

What we claim is:

Trichloroperylenetetracarboxylic acid diphenyldi-imide.

PAUL NAWIASKY.
ERICH BERTHOLD.